(12) United States Patent
Osaki

(10) Patent No.: US 9,370,999 B2
(45) Date of Patent: Jun. 21, 2016

(54) VEHICLE

(71) Applicant: YAMAHA HATSUDOKI KABUSHIKI KAISHA, Iwata-shi, Shizuoka (JP)

(72) Inventor: Hayato Osaki, Shizuoka (JP)

(73) Assignee: YAMAHA HATSUDOKI KABUSHIKI KAISHA, Shizuoka (JP)

(*) Notice: Subject to any disclaimer, the term of this patent is extended or adjusted under 35 U.S.C. 154(b) by 0 days.

(21) Appl. No.: 14/514,498

(22) Filed: Oct. 15, 2014

(65) Prior Publication Data

US 2015/0224874 A1 Aug. 13, 2015

(30) Foreign Application Priority Data

Feb. 7, 2014 (JP) ................. 2014-022207

(51) Int. Cl.
| | |
|---|---|
| *B60K 20/04* | (2006.01) |
| *B60K 17/08* | (2006.01) |
| *B60K 5/02* | (2006.01) |
| *B60K 17/02* | (2006.01) |
| *B60K 20/02* | (2006.01) |
| *F16H 59/00* | (2006.01) |

(52) U.S. Cl.
CPC . *B60K 17/08* (2013.01); *B60K 5/02* (2013.01); *B60K 17/02* (2013.01); *B60K 20/02* (2013.01); *F16H 59/00* (2013.01)

(58) Field of Classification Search
CPC ............................... B60K 17/02; B60K 17/04
USPC ......................................................... 180/292
See application file for complete search history.

(56) References Cited

U.S. PATENT DOCUMENTS

| | | | | | |
|---|---|---|---|---|---|
| 2,784,794 | A | * | 3/1957 | Barenyi ................. | B60G 21/05 180/292 |
| 3,799,283 | A | * | 3/1974 | Freber ..................... | B60G 9/00 180/56 |
| 4,253,535 | A | * | 3/1981 | Kleine ................. | B62D 21/183 180/291 |
| 4,425,976 | A | * | 1/1984 | Kimura ................ | B62D 31/003 180/56 |
| 4,828,017 | A | * | 5/1989 | Watanabe ............. | B60K 11/04 165/41 |
| 4,924,959 | A | * | 5/1990 | Handa .................. | B62D 21/183 123/185.3 |
| 6,070,689 | A | * | 6/2000 | Tanaka ..................... | B60K 5/00 180/291 |
| 7,000,727 | B2 | * | 2/2006 | Korenjak .............. | B60K 17/04 180/292 |
| 7,328,764 | B2 | * | 2/2008 | Penz ..................... | B60K 11/08 180/68.1 |
| 7,690,472 | B2 | * | 4/2010 | Kato ...................... | B60K 17/34 180/291 |
| 8,177,008 | B2 | * | 5/2012 | Yamamura ............... | B62D 5/04 180/443 |
| 8,256,561 | B2 | * | 9/2012 | Mochizuki .............. | B60K 5/00 123/195 R |
| 8,453,775 | B2 | * | 6/2013 | Belzile ................... | B60K 11/02 180/291 |
| 8,827,028 | B2 | * | 9/2014 | Sunsdahl ............. | B62D 21/183 180/292 |
| 2005/0173180 | A1 | * | 8/2005 | Hypes .................... | B60K 17/16 180/292 |
| 2009/0038875 | A1 | * | 2/2009 | Michalke .............. | B60R 13/083 180/292 |
| 2015/0224874 | A1 | * | 8/2015 | Osaki ..................... | B60K 17/08 180/292 |

* cited by examiner

*Primary Examiner* — Jeffrey J Restifo (74) *Attorney, Agent, or Firm* — Keating and Bennett, LLP (57) ABSTRACT

An ROV includes a body frame, first and second seats each including a seating portion, an engine disposed rearward relative to the seating portions and supported by the body frame, a transmission including a drive shaft and a main shaft configured to rotate by receiving a driving force from a crankshaft, and a transmission case provided as a component separate from the engine and spaced away from the engine and in which the transmission is contained. At least a portion of the transmission case is disposed between the seating portions and above a lower end of the seating portion and a lower end of the seating portion.

10 Claims, 7 Drawing Sheets

VEHICLE

This application claims priority to Patent Application No. 2014-22207 filed in Japan on Feb. 7, 2014, the entire contents of which are hereby incorporated by reference.

BACKGROUND OF THE INVENTION

1. Field of the Invention

The present invention relates to vehicles suitable for traveling on rough terrain.

2. Description of the Related Art

As a vehicle suitable for traveling on rough terrain, a recreational off-highway vehicle (which will hereinafter be referred to as an "ROV") is conventionally known. U.S. Pat. No. 8,177,008 B2 discloses an ROV in which an engine is disposed below two seats arranged in a vehicle width direction. The ROV disclosed in U.S. Pat. No. 8,177,008 B2 includes a transmission case in which a continuously variable transmission (which will hereinafter be referred to as a "CVT") is provided. The transmission case is integral with the engine.

SUMMARY OF THE INVENTION

Although a CVT is used in a conventional ROV, an ROV including a "stepped transmission" is desired from the viewpoint of further improving durability, for example. Since an ROV travels on rough terrain, there is also a demand for an increase in minimum road clearance of a bottom surface of the ROV. However, if a position of the bottom surface of the ROV according to U.S. Pat. No. 8,177,008 B2 which is measured from the ground is merely further raised, positions of the seats are raised. As a solution to such a problem, it is conceivable that the engine and the transmission case located below the seats may be disposed rearward relative to the seats, thus further lowering the positions of the seats. However, when an attempt is made to cause the engine and the transmission case to be disposed rearward relative to the seats, a large space has to be provided at a position rearward relative to the seats, which disadvantageously prevents components such as the engine from being compactly disposed and results in an increase in the size of the vehicle.

Accordingly, preferred embodiments of the present invention provide a vehicle in which positions of the seats are further lowered and flexibility of the layout of an engine and a transmission case is improved, thus preventing an increase in the size of the vehicle.

A vehicle according to a preferred embodiment of the present invention includes a body frame; a first seat including a first seating portion supported by the body frame and on which an occupant sits; a second seat including a second seating portion supported by the body frame and on which an occupant sits, the second seat being disposed rightward of the first seat; an engine including a crankshaft extending in a front-rear direction of the vehicle, the engine being supported by the body frame and disposed rearward relative to the first and second seating portions; a transmission configured to rotate by receiving a driving force from the crankshaft and including a main shaft provided with a plurality of first gears including a first axially movable gear, and a drive shaft provided with a plurality of second gears including a second axially movable gear and configured to intermesh with the first gears; and a transmission case provided as a component separate from the engine and spaced away from the engine and in which the transmission is contained. At least a portion of the transmission case is disposed between the first and second seating portions, and above a lower end of the first seating portion and a lower end of the second seating portion.

In the vehicle according to a preferred embodiment of the present invention, the engine is disposed rearward of the first and second seating portions. At least a portion of the transmission case spaced away from the engine is disposed between the first and second seating portions, and above the lower end of the first seating portion and the lower end of the second seating portion. Therefore, the first and second seating portions are disposed at lower positions than when the engine and the transmission case are disposed below the first and second seating portions. The engine and the transmission case are provided as separate components and spaced away from each other. Hence, the layout flexibility of each of the engine and the transmission case is improved compared to when the engine and the transmission case are integral with each other. More specifically, the engine and the transmission case are each disposed more compactly than when the engine and the transmission case are integral with each other, and as a result, an increase in the size of the vehicle is prevented.

According to a preferred embodiment of the present invention, the transmission preferably further includes an input shaft disposed coaxially with the crankshaft and configured to rotate by receiving a driving force from the crankshaft; and a clutch provided on the main shaft and to which a torque of the crankshaft is transmitted via the input shaft. The input shaft and the clutch preferably do not overlap with each other in a front view of the vehicle.

According to the above-described preferred embodiment, the clutch is replaced more easily than when the clutch is disposed coaxially with the crankshaft.

According to another preferred embodiment of the present invention, the transmission preferably further includes a third gear provided on the input shaft, and a fourth gear provided on the clutch and configured to intermesh with the third gear. A diameter of the third gear is preferably smaller than a diameter of the fourth gear.

According to the above-described preferred embodiment, a rotational frequency of the clutch is lower than a rotational frequency of the crankshaft due to the intermeshing of the third gear and the fourth gear. As a result, a load applied to the clutch is reduced, and the durability of the clutch is improved.

According to still another preferred embodiment of the present invention, the transmission preferably further includes an output shaft configured to rotate by receiving a driving force from the drive shaft. The output shaft preferably extends in the vehicle front-rear direction and is preferably connected to a propeller shaft configured to rotate by receiving a driving force from the output shaft. An axial center of the input shaft is preferably disposed below an axial center of the main shaft and above an axial center of the output shaft.

According to the above-described preferred embodiment, the clutch, which has a relatively large diameter. is compactly disposed inside the transmission case, while the input shaft and the output shaft are disposed at low positions.

According to yet another preferred embodiment of the present invention, the input shaft preferably overlaps with the first seat or the second seat in a plan view of the vehicle.

According to the above-described preferred embodiment, a distance between the first and second seats is reduced. Hence, the first and second seats are compactly disposed. As a result, a length of the vehicle in a width direction thereof is reduced.

According to still yet another preferred embodiment of the present invention, the clutch preferably is a multiplate wet clutch including a plurality of driving plates and a plurality of driven plates.

According to the above-described preferred embodiment, the clutch is a wet clutch and thus has high durability. Furthermore, the clutch is a multiplate clutch, and therefore, each plate is reduced in diameter while the performance of the clutch is ensured. As a result, the clutch is compactly disposed inside the transmission case.

According to another preferred embodiment of the present invention, the vehicle preferably further includes a shift fork configured to engage with the first and second movable gears; a shift drum provided with a groove with which the shift fork engages; a rotation plate fixed to one end of the shift drum and configured to rotate together with the shift drum; a shift lever that engages with the rotation plate; a shift shaft fixed to the shift lever and extending in the vehicle front-rear direction; a link member disposed in front of the transmission case and connected to the shift shaft; and a shift operation lever fixed to the link member and by which a transmission gear ratio of the transmission is changed. The clutch is preferably located rearward relative to the first and second movable gears.

According to the above-described preferred embodiment, a distance between the shift operation lever and the shift shaft is short, thus simplifying a structure of the link member. Furthermore, the link member is compactly disposed.

According to still another preferred embodiment of the present invention, the clutch is preferably disposed rightward relative to a right end of the first seating portion and leftward relative to a left end of the second seating portion.

According to the above-described preferred embodiment, the clutch is disposed between the first and second seating portions, and, therefore, the clutch is easily replaced.

According to yet another preferred embodiment of the present invention, the engine and the transmission case preferably overlap with each other in a front view of the vehicle.

According to the above-described preferred embodiment, the engine and the transmission case are disposed more compactly than when the engine and the transmission case are disposed so as to be deviated from each other in the front view of the vehicle.

According to still yet another preferred embodiment of the present invention, the engine preferably further includes a cylinder body including a plurality of cylinders arranged in the vehicle front-rear direction.

According to the above-described preferred embodiment, a length of the engine in the vehicle width direction is shorter than when the cylinders are arranged in the vehicle width direction. As a result, the engine is compactly disposed.

Various preferred embodiments of the present invention provide a vehicle in which positions of the seats are further lowered and flexibility of the layout of an engine and a transmission case is improved, thus preventing an increase in the size of the vehicle.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
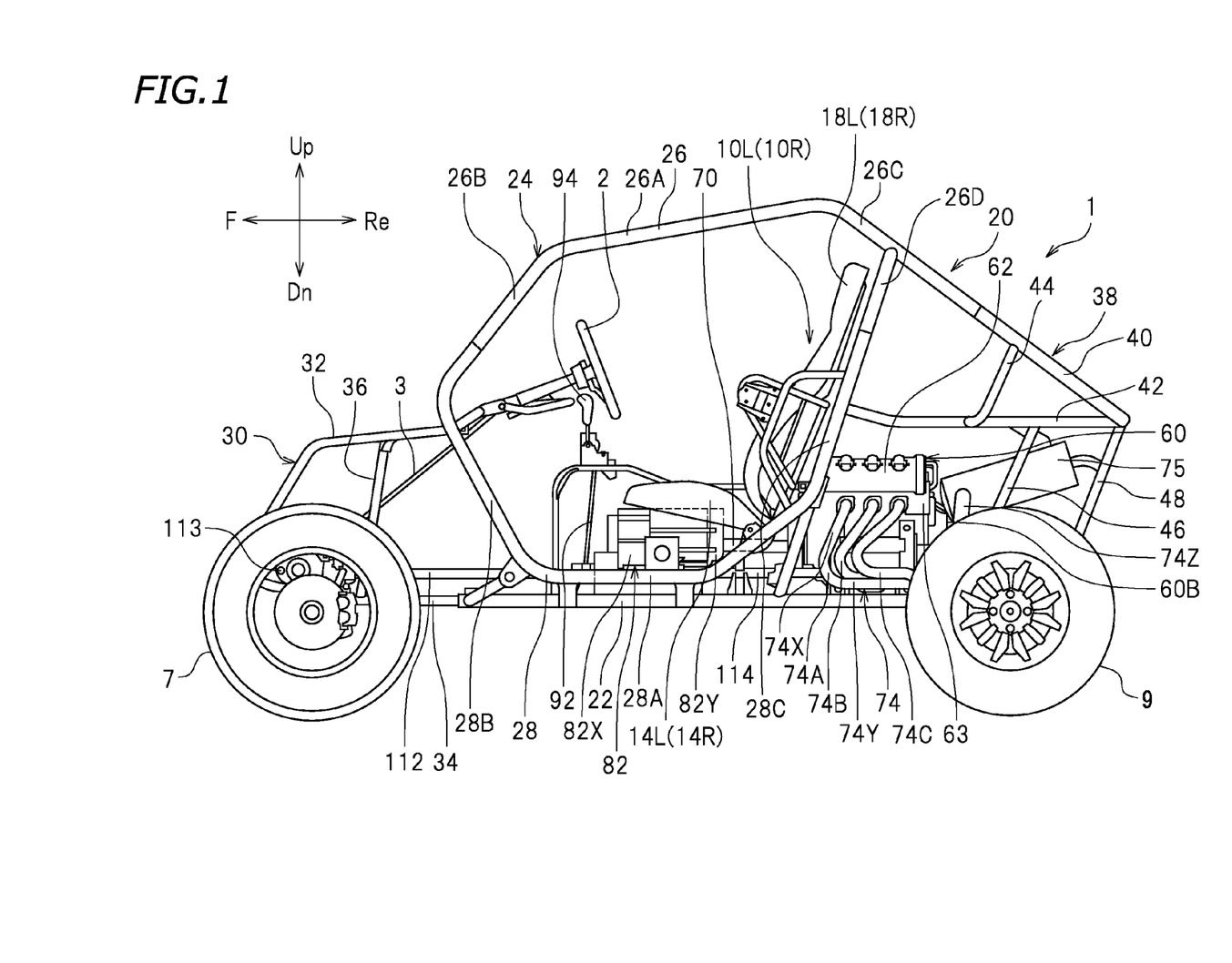
FIG. 1 is a left side view illustrating an ROV according to a preferred embodiment of the present invention.

Hereinafter, preferred embodiments of the present invention will be described. As illustrated in FIG. 1, a vehicle according to a preferred embodiment of the present invention is an ROV (recreational off-highway vehicle) 1. The ROV 1 is suitable for traveling on rough terrain. Note that the vehicle according to the present invention is not limited to an ROV.

In the following description, unless otherwise noted, the terms "front", "rear", "right", "left", "up" and "down" refer to front, rear, right, left, up and down with respect to an occupant sitting on a seat portion 14L of the ROV 1, respectively. "Up" and "down" correspond to a vertically upward direction and a vertically downward direction when the ROV 1 is brought to a stop on a horizontal plane, respectively. Reference signs "F", "Re", "R", "L", "Up" and "Dn" in the drawings represent front, rear, right, left, up and down, respectively.

As illustrated in FIG. 1, the ROV 1 preferably includes a body frame 20. The body frame 20 is preferably made up of pipe-shaped members. The body frame 20 preferably includes a main frame 22 that extends in a front-rear direction of the vehicle; a center frame 24 disposed above the main frame 22; a front frame 30 disposed in front of the center frame 24; and a rear frame 38 disposed rearward of the center frame 24.

The center frame 24 preferably includes right and left upper center frames 26 and right and left lower center frames 28. The upper center frames 26 are disposed above the lower center frames 28. Each upper center frame 26 is connected to the associated lower center frame 28. Each upper center frame 26 preferably includes a first portion 26A that extends in or substantially in the vehicle front-rear direction, a second portion 26B that extends obliquely downward and frontward from a front end of the first portion 26A, a third portion 26C that extends obliquely downward and rearward from a rear end of the first portion 26A; and a fourth portion 26D that extends obliquely downward and frontward from a position located somewhere along the third portion 26C. Each lower center frame 28 is disposed above the main frame 22. Each lower center frame 28 is connected to the main frame 22. Each lower center frame 28 preferably includes a first portion 28A that extends in the vehicle front-rear direction, a second portion 28B that extends obliquely upward and frontward from a front end of the first portion 28A, and a third portion 28C that extends obliquely upward and rearward from a rear end of the first portion 28A. The first portion 28A is connected to the main frame 22. The second portion 28B is connected to the second portion 26B of the associated upper center frame 26. The third portion 28C is connected to the fourth portion 26D of the associated upper center frame 26.

Figure 2:
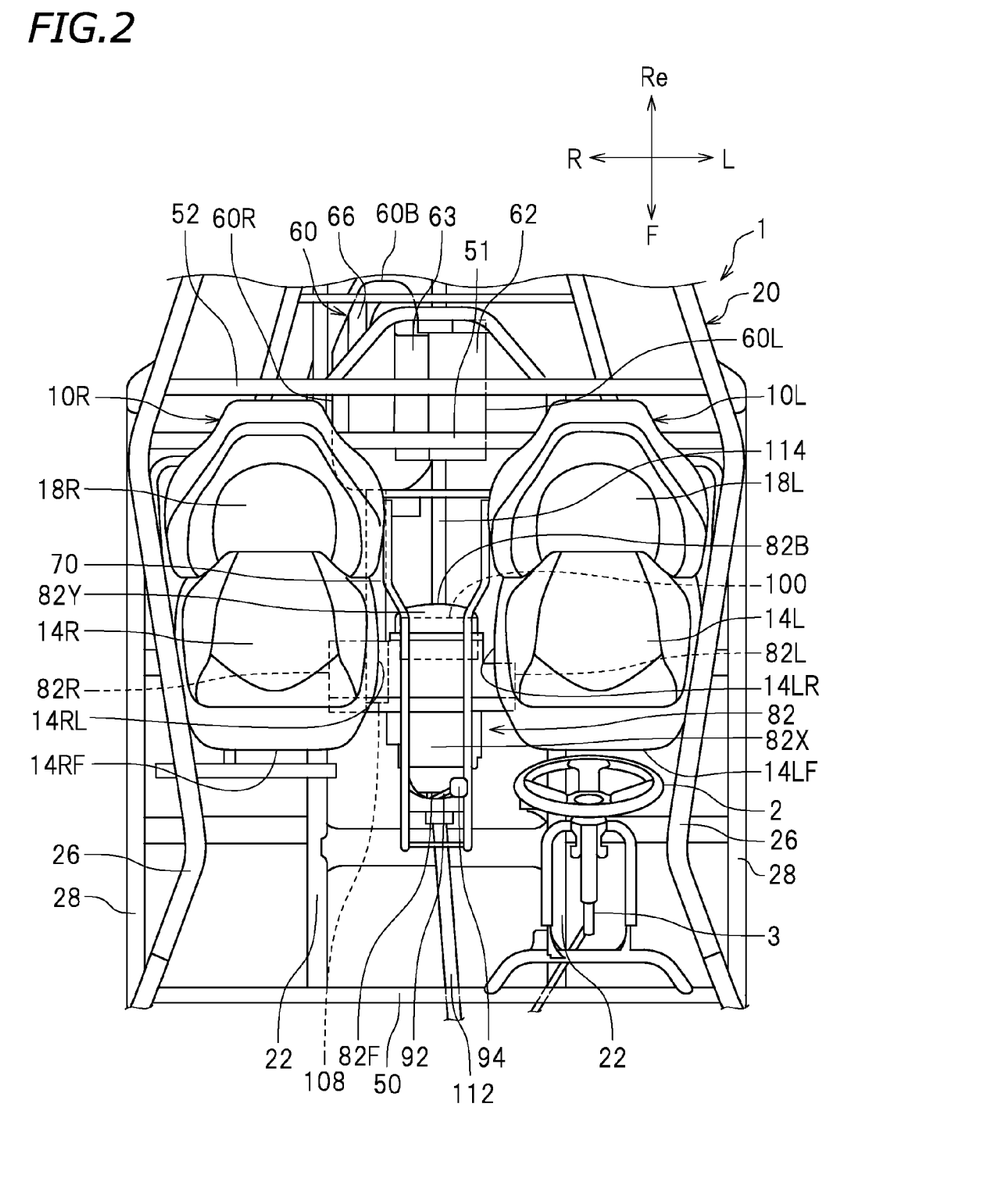
FIG. 2 is a plan view illustrating the ROV according to a preferred embodiment of the present invention.

As illustrated in FIG. 2, the body frame 20 preferably further includes a first cross member 50, a second cross member 51, and a third cross member 52. The first to third cross members 50 to 52 each extend in a width direction of the vehicle. The second cross member 51 is disposed rearward relative to the first cross member 50. The third cross member 52 is disposed rearward relative to the second cross member 51. The right and left lower center frames 28 are connected to each other through the first and second cross members 50 and 51. The right and left upper center frames 26 are connected to each other through the third cross member 52.

As illustrated in FIG. 1, the front frame 30 preferably includes an upper front frame 32, a lower front frame 34, and a front down frame 36. The upper front frame 32 is connected to the first cross member 50 (see FIG. 2). The upper front frame 32 extends frontward from the first cross member 50. The front down frame 36 extends downward from a position located somewhere along the upper front frame 32. The front down frame 36 is connected to a position located somewhere along the lower front frame 34. The lower front frame 34 extends in the vehicle front-rear direction. A front end of the lower front frame 34 is connected to the upper front frame 32. A rear end of the lower front frame 34 is connected to the main frame 22.

The rear frame 38 preferably includes right and left upper rear frames 40, right and left lower rear frames 42, right and left first rear down frames 44, right and left second rear down frames 46, and right and left third rear down frames 48. Each upper rear frame 40 extends obliquely downward and rearward from the third portion 26C of the associated upper center frame 26. Each lower rear frame 42 extends rearward from a position located somewhere along the third portion 28C of the associated lower center frame 28. Rear ends of the upper rear frames 40 and rear ends of the lower rear frames 42 are connected to each other. Each first rear down frame 44 extends obliquely downward and frontward from a position located somewhere along the associated upper rear frame 40. Each first rear down frame 44 is connected to a position located somewhere along the associated lower rear frame 42. Each second rear down frame 46 extends obliquely downward and frontward from a position located somewhere along the associated lower rear frame 42. Each second rear down frame 46 is disposed rearward relative to the associated first rear down frame 44. Each third rear down frame 48 extends obliquely downward and frontward from the rear end of the associated lower rear frame 42. Each third rear down frame 48 is disposed rearward relative to the associated second rear down frame 46.

As illustrated in FIG. 2, the ROV 1 preferably further includes a steering wheel 2. A steering shaft 3 is attached to the steering wheel 2. As illustrated in FIG. 1, the ROV 1 preferably further includes right and left front wheels 7, and right and left rear wheels 9. The right and left front wheels 7 are attached to an axle (not illustrated) which is provided at the front frame 30. The right and left rear wheels 9 are attached to an axle (not illustrated) which is provided at the rear frame 38. The right and left front wheels 7 are steered by the steering wheel 2.

Figure 3:
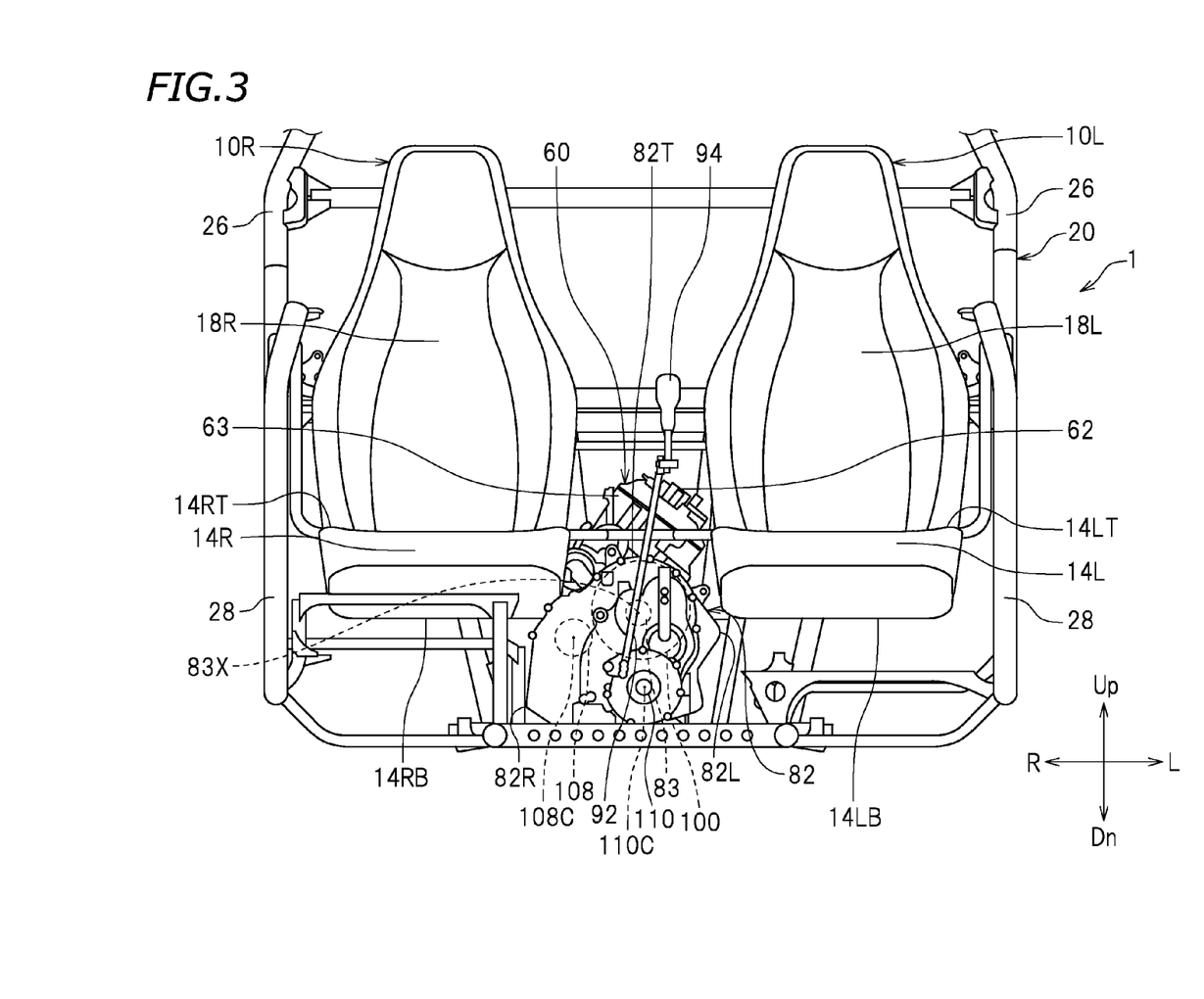
FIG. 3 is a front view illustrating a structure around the seats according to a preferred embodiment of the present invention.

As illustrated in FIG. 2, a right seat 10R and a left seat 10L are disposed rearward relative to the steering wheel 2. The left seat 10L is supported by the body frame 20. More specifically, the left seat 10L is supported by the main frame 22. The right seat 10R is supported by the body frame 20. More specifically, the right seat 10R is supported by the main frame 22. The left seat 10L is disposed behind the steering wheel 2. The right seat 10R is disposed rightward of the left seat 10L. The left seat 10L preferably includes the seating portion 14L on which an occupant sits, and a backrest portion 18L. As illustrated in FIG. 1, the seating portion 14L is disposed above the first portion 28A of the associated lower center frame 28. The backrest portion 18L is disposed frontward relative to the fourth portion 26D of the associated upper center frame 26. The backrest portion 18L is disposed frontward relative to the third portion 28C of the associated lower center frame 28. As illustrated in FIG. 3, the right seat 10R preferably includes a seating portion 14R on which an occupant sits, and a backrest portion 18R. As illustrated in FIG. 1, the seating portion 14R is disposed above the first portion 28A of the associated lower center frame 28. The backrest portion 18R is disposed frontward relative to the fourth portion 26D of the associated upper center frame 26. The backrest portion 18R is disposed frontward relative to the third portion 28C of the associated lower center frame 28.

The ROV 1 further includes an engine 60. The engine 60 is supported by the body frame 20. More specifically, the engine 60 is supported by the main frame 22. As illustrated in FIG. 2, the engine 60 is disposed rearward relative to the seating portion 14L of the left seat 10L and the seating portion 14R of the right seat 10R. As illustrated in FIG. 1, the engine 60 is disposed below the lower rear frames 42. A rear end 60B of the engine 60 is located rearward relative to the backrest portions 18R and 18L. The rear end 60B of the engine 60 is located rearward relative to the lower center frames 28. As illustrated in FIG. 2, a left end 60L of the engine 60 is located rightward relative to a right end 14LR of the seating portion 14L. A right end 60R of the engine 60 is located rightward relative to a left end 14RL of the seating portion 14R. A portion of the engine 60 overlaps with the right seat 10R in a plan view of the vehicle. More specifically, a crankcase 66 of the engine 60 overlaps with the backrest portion 18R of the right seat 10R in the plan view of the vehicle.

Figure 4:
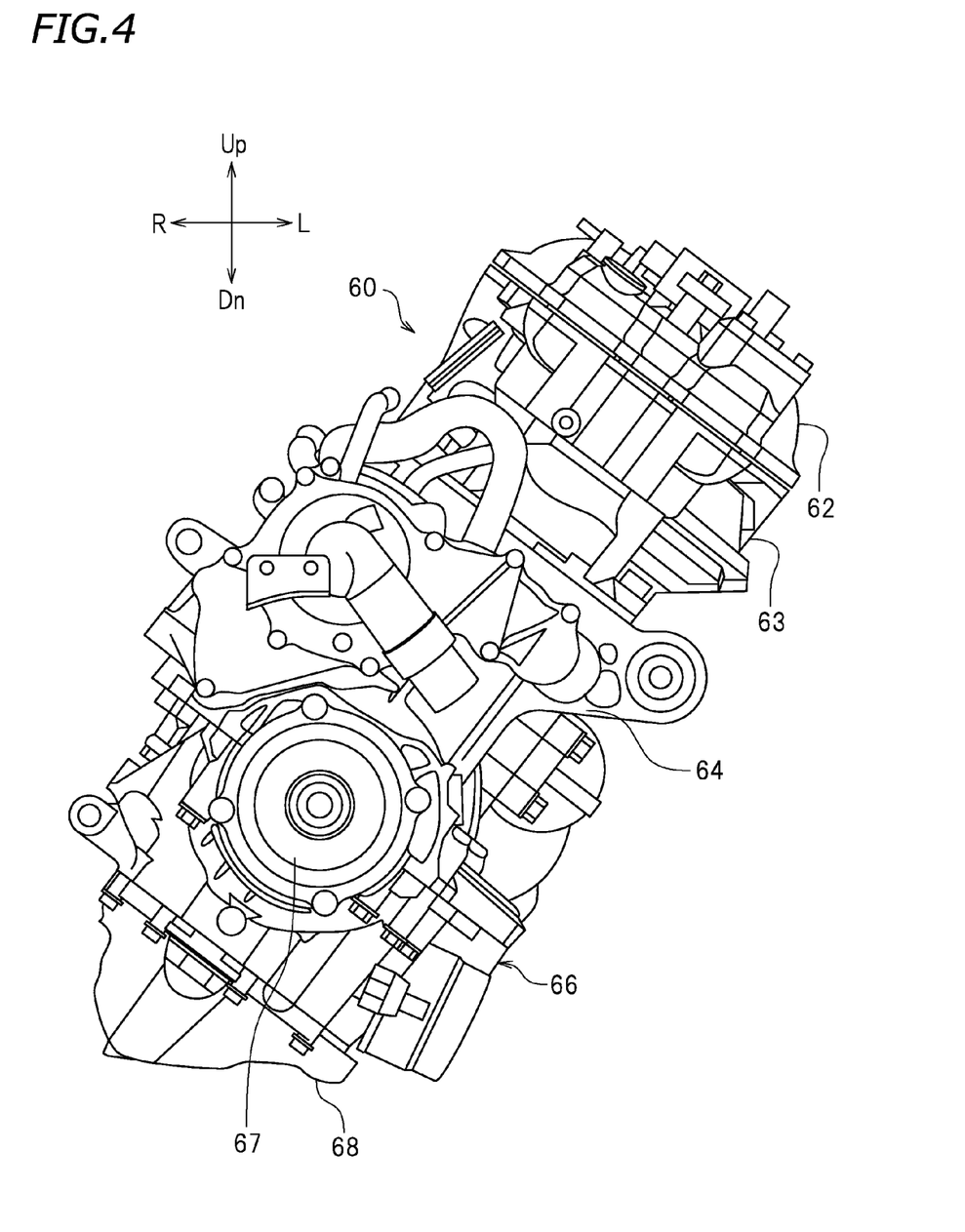
FIG. 4 is a front view illustrating an engine according to a preferred embodiment of the present invention.

As illustrated in FIG. 4, the engine 60 preferably includes the crankcase 66, a cylinder body 64, a cylinder head 63, and a cylinder head cover 62. An oil pan 68 is disposed under the crankcase 66. The oil pan 68 collects oil that has flowed through the engine 60. The cylinder body 64 extends upward from the crankcase 66. The cylinder head 63 is disposed on the cylinder body 64 and connected to an upper portion of the cylinder body 64. The cylinder head cover 62 is disposed on the cylinder head 63 and connected to an upper portion of the cylinder head 63.

Figure 5:
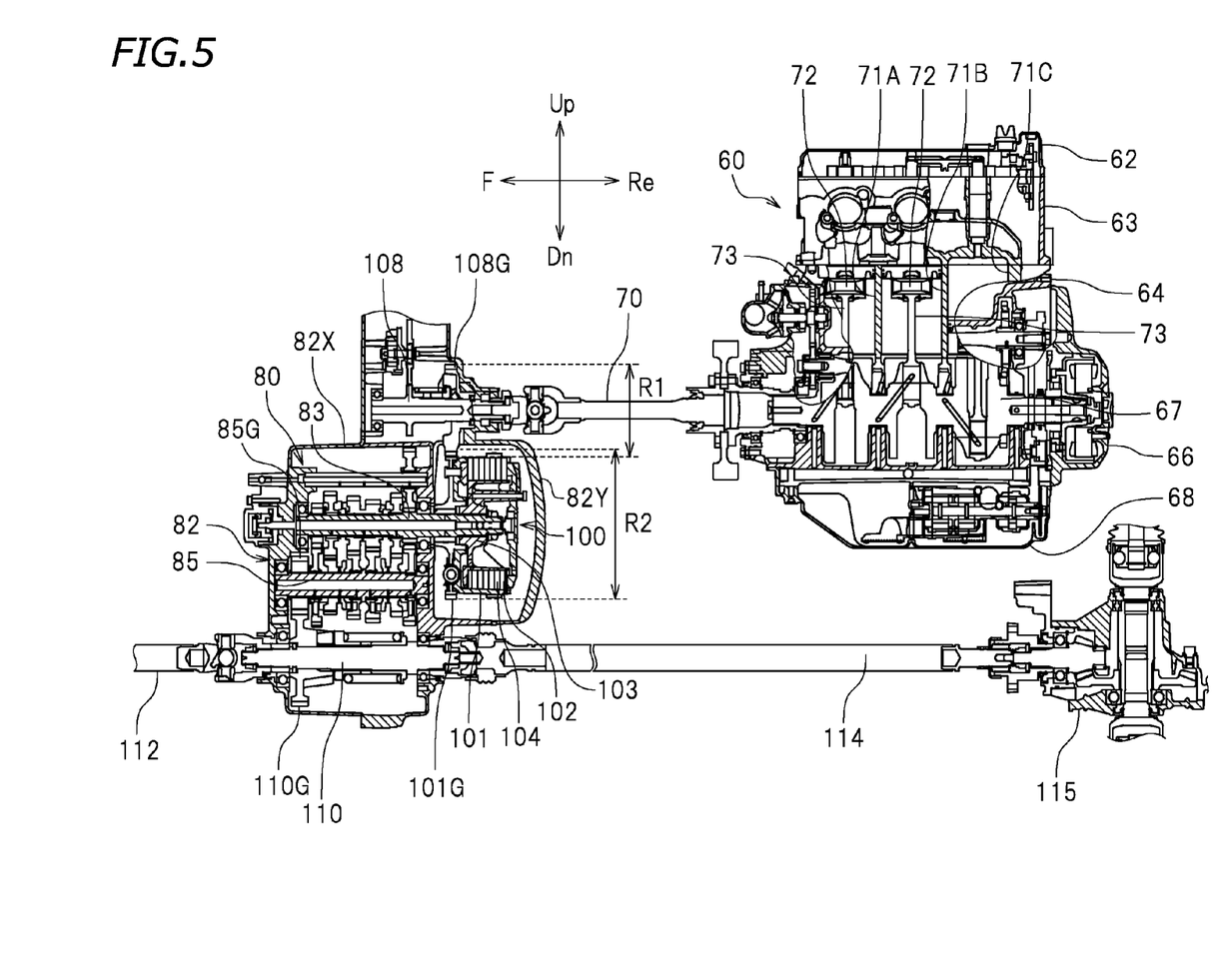
FIG. 5 is a cross-sectional view illustrating structures of the engine and a transmission according to a preferred embodiment of the present invention.

As illustrated in FIG. 5, the engine 60 preferably further includes a crankshaft 67 that extends in the vehicle front-rear direction. The crankshaft 67 is disposed inside the crankcase 66. A connecting shaft 70 is connected to a front end portion of the crankshaft 67. The connecting shaft 70 is connected to an input shaft 108 which will be described below. As illustrated in FIG. 2, the connecting shaft 70 overlaps with the right seat 10R in the plan view of the vehicle. More specifically, the connecting shaft 70 overlaps with the seating portion 14R and the backrest portion 18R in the plan view of the vehicle. Alternatively, the connecting shaft 70 may be disposed so that the connecting shaft 70 overlaps with the left seat 10L in the plan view of the vehicle.

As illustrated in FIG. 5, a first cylinder 71A, a second cylinder 71B, and a third cylinder 71C are provided inside the cylinder body 64. The first, second, and third cylinders 71A, 71B and 71C extend upward from a lateral portion of the crankcase 66. The first, second, and third cylinders 71A, 71B, and 71C are arranged in the vehicle front-rear direction. The second cylinder 71B is disposed rearward of the first cylinder 71A. The third cylinder 71C is disposed rearward of the second cylinder 71B. The engine 60 is preferably a three cylinder engine, for example. A piston 72 is contained in each of the first, second, and third cylinders 71A, 71B, and 71C. Each piston 72 is connected to the crankshaft 67 via an associated connecting rod 73. Although the engine 60 according to the present preferred embodiment preferably is a three cylinder engine provided with three cylinders, i.e., the first to third cylinders 71A to 71C, the engine according to preferred embodiments of the present invention may be a single cylinder engine provided with a single cylinder or may be a multi-cylinder engine provided with two cylinders or four or more cylinders.

As illustrated in FIG. 1, the ROV 1 preferably further includes an exhaust pipe 74 through which exhaust gas discharged from the engine 60 flows, and a silencer 75. The exhaust pipe 74 is connected to the engine 60. The exhaust pipe 74 preferably includes a first exhaust pipe 74A in communication with the first cylinder 71A, a second exhaust pipe 74B in communication with the second cylinder 71B, and a third exhaust pipe 74C in communication with the third cylinder 71C. Each of the first to third exhaust pipes 74A to 74C preferably includes a first portion 74X that extends obliquely downward and frontward from the cylinder head 63, and a second portion 74Y that extends rearward from the first portion 74X. At rear ends of the second portions 74Y, the first to third exhaust pipes 74A to 74C are combined into a single pipe defining a third portion 74Z. The silencer 75 is connected to a rear end of the third portion 74Z. Note that the exhaust pipe 74 and the silencer 75 are not illustrated in FIGS. 2 and 3 for the sake of convenience.

As illustrated in FIG. 1, the ROV 1 further includes a transmission 80 (see FIG. 5), and a transmission case 82 in which the transmission 80 is contained. The transmission case 82 preferably includes a case main body 82X and a case cover 82Y. The transmission case 82 and the engine 60 are provided as separate components. The transmission case 82 is spaced away from the engine 60. The transmission case 82 is disposed frontward relative to the engine 60. The transmission case 82 is attached to the main frame 22. As illustrated in FIG. 3, the engine 60 and the transmission case 82 overlap with each other in a front view of the vehicle. However, the cylinder head cover 62 and the transmission case 82 do not overlap with each other in the front view of the vehicle.

As illustrated in FIG. 2, at least a portion of the transmission case 82 is disposed between the seating portion 14L of the left seat 10L and the seating portion 14R of the right seat 10R. As illustrated in FIG. 3, at least a portion of the transmission case 82 is disposed above a lower end 14LB of the seating portion 14L of the left seat 10L. More specifically, an upper end 82T of the transmission case 82 is disposed above the lower end 14LB of the seating portion 14L. The upper end 82T of the transmission case 82 is disposed below an upper end 14LT of the seating portion 14L. At least a portion of the transmission case 82 is disposed above a lower end 14RB of the seating portion 14R of the right seat 10R. More specifically, the upper end 82T of the transmission case 82 is disposed above the lower end 14RB of the seating portion 14R. The upper end 82T of the transmission case 82 is disposed below an upper end 14RT of the seating portion 14R. As illustrated in FIG. 2, a portion of the transmission case 82 overlaps with the seating portion 14L in the plan view of the vehicle. A left end 82L of the transmission case 82 is located leftward relative to the right end 14LR of the seating portion 14L. A portion of the transmission case 82 overlaps with the seating portion 14R in the plan view of the vehicle. A right end 82R of the transmission case 82 is located rightward relative to the left end 14RL of the seating portion 14R. A rear end 82B of the transmission case 82 is located rearward relative to a front end 14RF of the seating portion 14R and a front end 14LF of the seating portion 14L. A front end 82F of the transmission case 82 is located frontward relative to the front end 14RF of the seating portion 14R and the front end 14LF of the seating portion 14L.

As illustrated in FIG. 5, the transmission 80 preferably includes the input shaft 108, a clutch 100, a main shaft 83, a drive shaft 85, and an output shaft 110.

The input shaft 108 extends in the vehicle front-rear direction. The input shaft 108 is contained inside the transmission case 82. The input shaft 108 is disposed coaxially with the crankshaft 67. An axial center 108C (see FIG. 3) of the input shaft 108 may be different from an axial center (not illustrated) of the crankshaft 67. The input shaft 108 is connected to the connecting shaft 70. The input shaft 108 rotates by receiving a driving force from the crankshaft 67. The input shaft 108 is provided with a gear 108G. As illustrated in FIG. 3, the axial center 108C of the input shaft 108 is disposed below an axial center 83X of the main shaft 83 which will be described below. The axial center 108C of the input shaft 108 is disposed above an axial center 110C of the output shaft 110 which will be described below. The input shaft 108 is disposed rightward relative to the main shaft 83. The input shaft 108 is disposed rightward relative to the output shaft 110. As illustrated in FIG. 2, the input shaft 108 is located rightward relative to the clutch 100. The input shaft 108 overlaps with the right seat 10R in the plan view of the vehicle. More specifically, the input shaft 108 overlaps with the seating portion 14R in the plan view of the vehicle. Alternatively, the input shaft 108 may be located leftward relative to the clutch 100. In that case, the input shaft 108 may overlap with the left seat 10L in the plan view of the vehicle, and more specifically, the input shaft 108 may overlap with the seating portion 14L in the plan view of the vehicle. As illustrated in FIG. 5, the input shaft 108 is connected to the crankshaft 67 via the connecting shaft 70 in the present preferred embodiment, but the input shaft 108 may be directly connected to the crankshaft 67.

Figure 6:
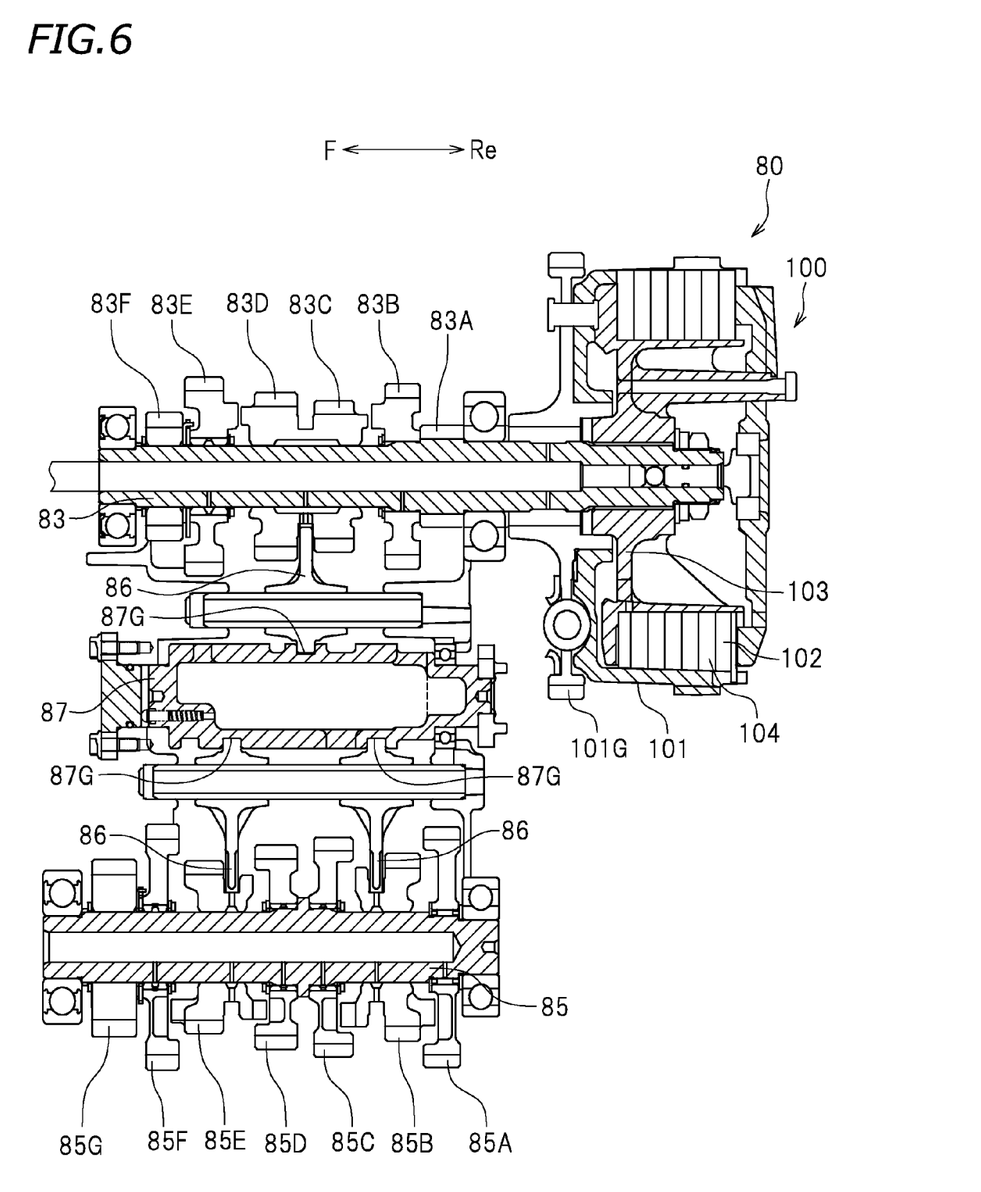
FIG. 6 is a cross-sectional view illustrating the transmission according to a preferred embodiment of the present invention.

The clutch 100 is preferably a multiplate wet friction clutch. A torque produced by the crankshaft 67 is transmitted to the clutch 100 via the input shaft 108. The clutch 100 transmits or interrupts the torque produced by the crankshaft 67. The clutch 100 is disposed inside the transmission case 82. The clutch 100 is exposed to the outside by detaching the case cover 82Y of the transmission case 82 from the case main body 82X. The clutch 100 is provided at a rear end portion of the main shaft 83. As illustrated in FIG. 6, the clutch 100 is located rearward of main shaft gears 83A to 83F of the main shaft 83 which will be described below. The clutch 100 is located rearward of drive shaft gears 85A to 85F of the drive shaft 85 which will be described below. As illustrated in FIG. 2, the clutch 100 is disposed between the right and left seats 10R and 10L. The clutch 100 is disposed rightward of the right end 14LR of the seating portion 14L. The clutch 100 is disposed leftward of the left end 14RL of the seating portion 14R. As illustrated in FIG. 3, the clutch 100 and the input shaft 108 do not overlap with each other in the front view of the vehicle. As illustrated in FIG. 6, the clutch 100 preferably includes a clutch housing 101, a clutch boss 103, a plurality of driving plates 102, and a plurality of driven plates 104. The driving plates 102 are provided inward of the clutch housing 101. The driving plates 102 rotate together with the clutch housing 101. The torque of the crankshaft 67 (see FIG. 5) is transmitted to the driving plates 102. The driven plates 104 are arranged outward of the clutch boss 103. The driven plates 104 rotate together with the clutch boss 103. The driving plates 102 and the driven plates 104 are alternately disposed in the vehicle front-rear direction. The clutch housing 101 is provided with a gear 101G. As illustrated in FIG. 5, the gear 101G intermeshes with the gear 108G of the input shaft 108. Therefore, the clutch housing 101 is connected to the input shaft 108. A diameter R1 of the gear 108G is smaller than a diameter R2 of the gear 101G. The clutch 100 may be a single plate friction clutch. The clutch 100 may be a dry friction clutch.

The main shaft 83 extends in the vehicle front-rear direction. The main shaft 83 is contained inside the transmission case 82. The main shaft 83 is disposed parallel or substantially parallel with the input shaft 108. The main shaft 83 is fixed to the clutch boss 103. The main shaft 83 rotates together with the clutch boss 103. The main shaft 83 rotates by receiving a driving force from the crankshaft 67. As illustrated in FIG. 6, the main shaft 83 is provided with the main shaft gears 83A to 83F. The main shaft gears 83A, 83B, 83E, and 83F are fixed gears which are immovable in an axial direction of the main shaft 83. The main shaft gears 83C and 83D are movable gears which are movable in the axial direction of the main shaft 83. The main shaft gears 83A to 83F rotate together with the main shaft 83. The main shaft gears 83B and 83E relatively rotate with respect to the main shaft 83 depending on the intermeshing states of the main shaft gears 83B and 83E. As illustrated in FIG. 3, the axial center 83X of the main shaft 83 is located above the lower end 14LB of the seating portion 14L and the lower end 14RB of the seating portion 14R. The axial center 83X of the main shaft 83 is located rightward relative to the axial center 110C of the output shaft 110 which will be described below.

As illustrated in FIG. 5, the drive shaft 85 extends in the vehicle front-rear direction. The drive shaft 85 is contained inside the transmission case 82. The drive shaft 85 is disposed parallel or substantially parallel with the main shaft 83. As illustrated in FIG. 6, the drive shaft 85 is provided with the drive shaft gears 85A to 85F. The drive shaft gears 85A to 85F are arranged so that the drive shaft gears 85A to 85F intermesh with the main shaft gears 83A to 83F, respectively. The drive shaft gears 85A, 85C, 85D, and 85F are fixed gears which are immovable in an axial direction of the drive shaft 85. The drive shaft gears 85B and 85E are movable gears which are movable in the axial direction of the drive shaft 85. The drive shaft gears 85A to 85F rotate together with the drive shaft 85. The drive shaft gears 85A, 85C, 85D, and 85F relatively rotate with respect to the drive shaft 85 depending on intermeshing states of the drive shaft gears 85A, 85C, 85D, and 85F. A front end portion of the drive shaft 85 is provided with a gear 85G. The gear 85G is disposed frontward relative to the drive shaft gear 85F.

As illustrated in FIG. 5, the output shaft 110 extends in the vehicle front-rear direction. The output shaft 110 is contained inside the transmission case 82. The output shaft 110 is provided with a gear 110G. The gear 110G intermeshes with the gear 85G of the drive shaft 85. Therefore, the output shaft 110 is connected to the drive shaft 85. The output shaft 110 rotates by receiving a driving force from the drive shaft 85. A front propeller shaft 112 is connected to a front end portion of the output shaft 110. The front propeller shaft 112 extends in the vehicle front-rear direction. The front propeller shaft 112 rotates by receiving a driving force from the output shaft 110. The front propeller shaft 112 is connected to the right and left front wheels 7 (see FIG. 1) via a front differential 113 (see FIG. 1). A rear propeller shaft 114 is connected to a rear end portion of the output shaft 110. The rear propeller shaft 114 extends in the vehicle front-rear direction. The rear propeller shaft 114 rotates by receiving a driving force from the output shaft 110. The rear propeller shaft 114 is connected to the right and left rear wheels 9 (see FIG. 1) via a final gear 115. Although the ROV according to the present preferred embodiment is a four-wheel drive vehicle, the vehicle according to other preferred embodiments of the present invention is not limited to a four-wheel drive vehicle.

As illustrated in FIG. 6, the transmission 80 preferably further includes a shift drum 87 and shift forks 86. The shift drum 87 is provided with a plurality of grooves 87G with axial positions that change in accordance with an angle of rotation of the shift drum 87. Each shift fork 86 is engaged with the associated groove 87G. The shift forks 86 are engaged with the main shaft gears 83C and 83D and the drive shaft gears 85B and 85E. Upon rotation of the shift drum 87, the shift forks 86 move in an axial direction of the shift drum 87. Then, the shift forks 86 move at least one of the main shaft gears 83C and 83D and the drive shaft gears 85B and 85E. As a result, a combination of the main shaft gear of the main shaft 83 and the drive shaft gear of the drive shaft 85 which intermesh with each other is changed, thus changing a transmission gear ratio.

Figure 7:
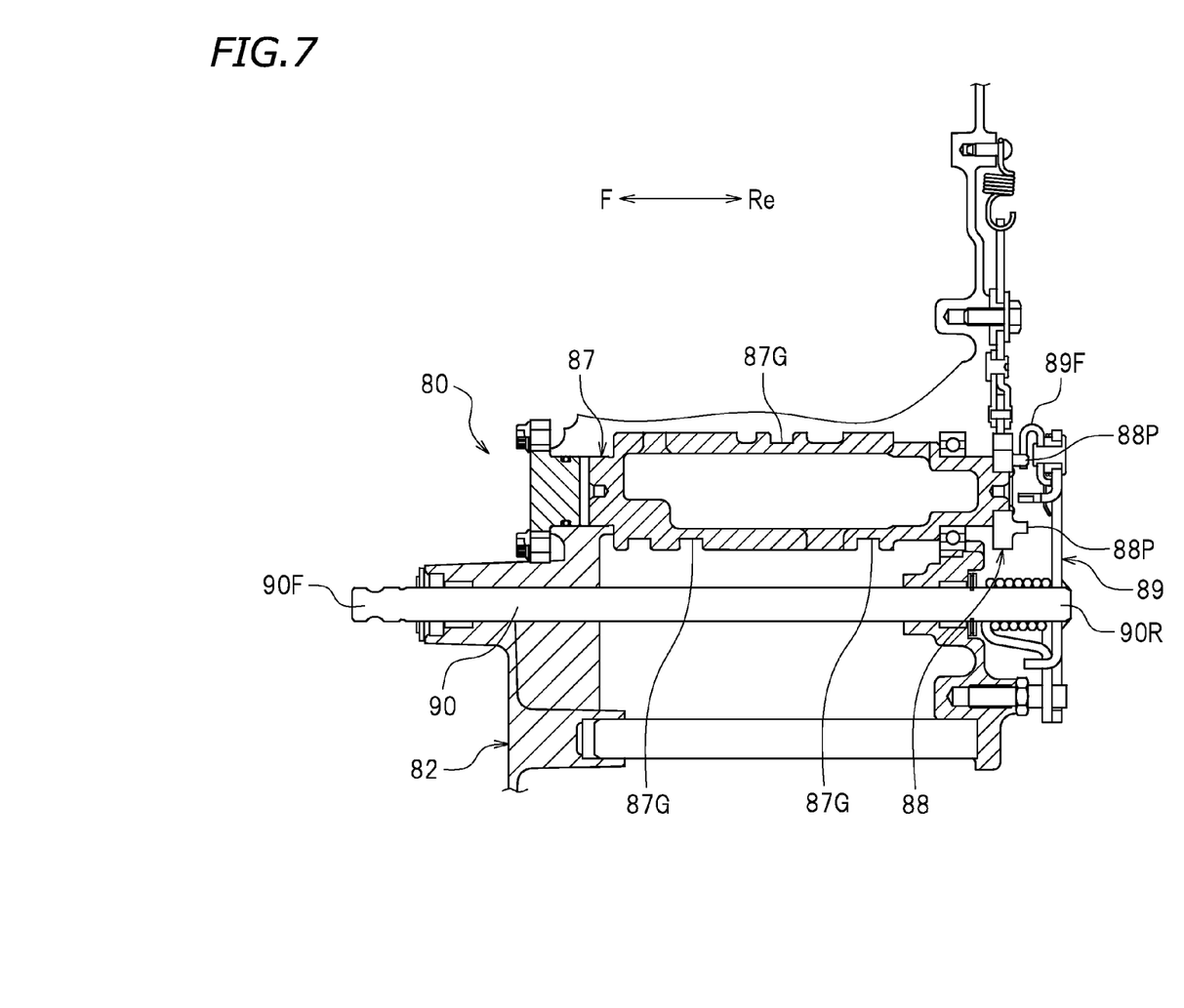
FIG. 7 is a cross-sectional view illustrating a structure around a shift drum according to a preferred embodiment of the present invention.

As illustrated in FIG. 7, the transmission 80 preferably further includes a shift shaft 90. The shift shaft 90 extends in the vehicle front-rear direction. The shift shaft 90 is arranged so as to be rotatable. The shift shaft 90 is supported by the transmission case 82. A shift lever 89 which will be described below is fixed to a rear end portion 90R of the shift shaft 90. A front end portion 90F of the shift shaft 90 is located outward of the transmission case 82. The front end portion 90F of the shift shaft 90 is connected to a link member 92 (see FIG. 1). As illustrated in FIG. 1, a shift operation lever 94 by which the transmission gear ratio of the transmission 80 is changed is fixed to an upper portion of the link member 92. The link member 92 is disposed in front of the transmission case 82.

As illustrated in FIG. 7, the transmission 80 preferably further includes a rotation plate 88 and the shift lever 89. The rotation plate 88 preferably includes a plurality of pins 88P. The rotation plate 88 is fixed to a rear end of the shift drum 87. The rotation plate 88 rotates together with the shift drum 87. The shift lever 89 is engaged with the rotation plate 88. The shift lever 89 is provided with a hook 89F that is engageable with the pin(s) 88P of the rotation plate 88.

When the shift operation lever 94 (see FIG. 1) is operated by the occupant, the shift shaft 90 rotates and thus the shift lever 89 rotates. In this case, the hook 89F of the shift lever 89 and the pin(s) 88P of the rotation plate 88 engage with each other, thus causing the shift drum 87 to rotate together with the rotation plate 88. As a result, the transmission gear ratio is changed.

In the ROV 1, as illustrated in FIGS. 2 and 3, the engine 60 is disposed rearward relative to the seating portions 14R and 14L as described above. At least a portion of the transmission case 82 spaced away from the engine 60 is disposed between the seating portions 14R and 14L, and above the lower end 14LB of the seating portion 14L and the lower end 14RB of the seating portion 14R. Therefore, the seating portions 14R and 14L are disposed at lower positions than when the engine 60 and the transmission case 82 are disposed below the seating portions 14R and 14L. The engine 60 and the transmission case 82 are provided as separate components and spaced away from each other. Hence, the layout flexibility of each of the engine 60 and the transmission case 82 is improved compared to when the engine 60 and the transmission case 82 are integral with each other. More specifically, the engine 60 and the transmission case 82 are each disposed more compactly than when the engine 60 and the transmission case 82 are integral with each other, and as a result, an increase in the size of the ROV 1 is prevented.

In the ROV 1 according to the present preferred embodiment, the input shaft 108 and the clutch 100 do not overlap with each other in the front view of the vehicle. As a result, the clutch 100 is replaced more easily than when the clutch 100 is disposed coaxially with the crankshaft 67.

In the ROV 1 according to the present preferred embodiment, as illustrated in FIG. 5, the diameter R1 of the gear 108G of the input shaft 108 is smaller than the diameter R2 of the gear 101G of the clutch 100. Thus, a rotational frequency of the clutch 100 is lower than a rotational frequency of the crankshaft 67 due to the intermeshing of the gear 108G and the gear 101G. As a result, a load applied to the clutch 100 is reduced, and durability of the clutch 100 is improved.

In the ROV 1 according to the present preferred embodiment, as illustrated in FIG. 3, the axial center 108C of the input shaft 108 is disposed below the axial center 83X of the main shaft 83 and above the axial center 110C of the output shaft 110. Consequently, the clutch 100, which has a relatively large diameter, is compactly disposed inside the transmission case 82, while the input shaft 108 and the output shaft 110 are disposed at low positions.

In the ROV 1 according to the present preferred embodiment, as illustrated in FIG. 2, the input shaft 108 overlaps with the seat 10R in the plan view of the vehicle. Thus, a distance between the seats 10R and 10L is reduced. Hence, the seats 10R and 10L are compactly disposed. As a result, a length of the ROV 1 in the vehicle width direction is reduced.

In the ROV 1 according to the present preferred embodiment, as illustrated in FIG. 6, the clutch 100 is preferably a wet clutch and thus has a high durability. Furthermore, the clutch 100 is preferably a multiplate clutch including a plurality of the driving plates 102 and a plurality of the driven plates 104, and therefore, the plates 102 and 104 are reduced in diameter while the performance of the clutch 100 is ensured. As a result, the clutch 100 is compactly disposed inside the transmission case 82.

In the ROV 1 according to the present preferred embodiment, as illustrated in FIG. 1, the link member 92 connected to the shift shaft 90 is disposed in front of the transmission case 82, and the shift operation lever 94 is fixed to the link member 92. As illustrated in FIG. 6, the clutch 100 is located rearward relative to the main shaft gears 83A to 83F and the drive shaft gears 85A to 85F. As a result, a distance between the shift operation lever 94 and the shift shaft 90 is short, thus simplifying a structure of the link member 92. Furthermore, the link member 92 is compactly disposed.

In the ROV 1 according to the present preferred embodiment, as illustrated in FIG. 2, the clutch 100 is disposed rightward relative to the right end 14LR of the seating portion 14L and leftward relative to the left end 14RL of the seating portion 14R. Moreover, a space is provided between the transmission case 82 and the engine 60. As a result, the clutch 100 is easily replaced.

In the ROV 1 according to the present preferred embodiment, as illustrated in FIG. 3, the engine 60 and the transmission case 82 overlap with each other in the front view of the vehicle. As a result, the engine 60 and the transmission case 82 are disposed more compactly than when the engine 60 and the transmission case 82 are disposed so as to be deviated from each other in the front view of the vehicle.

In the ROV 1 according to the present preferred embodiment, as illustrated in FIG. 5, the engine 60 preferably includes the cylinder body 64 that includes a plurality of cylinders, i.e., the cylinders 71A, 71B, and 71C, which are arranged in the vehicle front-rear direction. Therefore, a length of the engine 60 in the vehicle width direction is shorter than when the cylinders 71A, 71B, and 71C are arranged in the vehicle width direction. As a result, the engine 60 is compactly disposed.

In the foregoing preferred embodiments, the transmission 80 is preferably a manual transmission that changes gears in accordance with an operation performed by the occupant, but the transmission according to another preferred embodiment of the present invention is not limited to such a manual transmission. For example, the transmission may be an automatic transmission that automatically changes gears of the transmission by a motor in accordance with an operating state of the vehicle, irrespective of an intention of the driver. Alternatively, the transmission may be an automated manual transmission that changes gears of the transmission by a motor that is driven in accordance with an operation performed by the driver.

Although the clutch 100 is located rearward relative to the main shaft gears 83A to 83F of the main shaft 83 and the drive shaft gears 85A to 85F of the drive shaft 85 in the foregoing preferred embodiments, the location of the clutch 100 is not limited to such a location. Alternatively, the clutch 100 may be located frontward relative to the main shaft gears 83A to 83F and the drive shaft gears 85A to 85F.

The terms and expressions used herein are used for explanation purposes and should not be construed as being restrictive. It should be appreciated that the terms and expressions used herein do not eliminate any equivalents of features illustrated and mentioned herein, and allow various modifications falling within the claimed scope of the present invention. The present invention may be embodied in many different forms. The present disclosure is to be considered as providing examples of the principles of the invention. These examples are described herein with the understanding that such examples are not intended to limit the present invention to preferred embodiments described herein and/or illustrated herein. Hence, the present invention is not limited to the preferred embodiments described herein. The present invention includes any and all preferred embodiments including equivalent elements, modifications, omissions, combinations, adaptations and/or alterations as would be appreciated by those skilled in the art on the basis of the present disclosure. The limitations in the claims are to be interpreted broadly based on the language included in the claims and not limited to examples described in the present specification or during the prosecution of the application.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vehicle comprising:
   a body frame;
   a first seat including a first seating portion supported by the body frame and on which an occupant sits;
   a second seat including a second seating portion supported by the body frame and on which an occupant sits, the second seat being disposed rightward of the first seat;
   an engine including a crankshaft extending in a front-rear direction of the vehicle, the engine being supported by the body frame and disposed rearward relative to the first and second seating portions;
   a transmission configured to rotate by receiving a driving force from the crankshaft and including a main shaft provided with a plurality of first gears including a first axially movable gear, and a drive shaft provided with a plurality of second gears including a second axially movable gear and configured to intermesh with the first gears; and
   a transmission case provided as a component separate from the engine and spaced away from the engine and in which the transmission is contained; wherein at least a portion of the transmission case is disposed between the first and second seating portions, and above a lower end of the first seating portion and a lower end of the second seating portion.

2. The vehicle according to claim 1, wherein the transmission further includes:
an input shaft disposed coaxially with the crankshaft and configured to rotate by receiving a driving force from the crankshaft; and
a clutch provided on the main shaft and to which a torque of the crankshaft is transmitted via the input shaft; wherein
the input shaft and the clutch do not overlap with each other in a front view of the vehicle.

3. The vehicle according to claim 2, wherein the transmission further includes:
a third gear provided on the input shaft; and
a fourth gear provided on the clutch and configured to intermesh with the third gear; wherein
a diameter of the third gear is smaller than a diameter of the fourth gear.

4. The vehicle according to claim 2, wherein the transmission further includes an output shaft configured to rotate by receiving a driving force from the drive shaft;
the output shaft extends in the vehicle front-rear direction and is connected to a propeller shaft configured to rotate by receiving a driving force from the output shaft; and
an axial center of the input shaft is disposed below an axial center of the main shaft and above an axial center of the output shaft.

5. The vehicle according to claim 2, wherein the input shaft overlaps with the first seat or the second seat in a plan view of the vehicle.

6. The vehicle according to claim 2, wherein the clutch is a multiplate wet clutch including a plurality of driving plates and a plurality of driven plates.

7. The vehicle according to claim 2, further comprising:
a shift fork configured to engage with the first and second movable gears;
a shift drum provided with a groove with which the shift fork engages;
a rotation plate fixed to one end of the shift drum and configured to rotate together with the shift drum;
a shift lever that engages with the rotation plate;
a shift shaft fixed to the shift lever and extending in the vehicle front-rear direction;
a link member disposed in front of the transmission case and connected to the shift shaft; and
a shift operation lever fixed to the link member and by which a transmission gear ratio of the transmission is changed; wherein
the clutch is located rearward relative to the first and second movable gears.

8. The vehicle according to claim 2, wherein the clutch is disposed rightward relative to a right end of the first seating portion and leftward relative to a left end of the second seating portion.

9. The vehicle according to claim 1, wherein the engine and the transmission case overlap with each other in a front view of the vehicle.

10. The vehicle according to claim 1, wherein the engine further includes a cylinder body including a plurality of cylinders arranged in the vehicle front-rear direction.

* * * * *